United States Patent [19]

Demos

[11] 3,845,734
[45] Nov. 5, 1974

[54] APPARENT WIND INDICATOR ADAPTED TO ESTABLISH OPTIMUM WIND DIRECTION RELATIVE TO THE SAIL OF A SAILBOAT

[76] Inventor: Peter T. Demos, 49 Orchard St., Belmont, Mass. 02178

[22] Filed: Nov. 28, 1972

[21] Appl. No.: 310,027

[52] U.S. Cl. .............................. 116/114 R, 73/188
[51] Int. Cl. .......................................... G01d 21/00
[58] Field of Search... 116/28 R, 114 R, 132, 136.5; 73/188, 189

[56] References Cited
UNITED STATES PATENTS

| 2,100,833 | 11/1937 | Bruckel et al. | 116/136.5 |
| 2,681,569 | 6/1954 | Hirschoff | 73/188 |
| 3,049,008 | 8/1962 | Polster | 73/188 |
| 3,507,150 | 4/1970 | Stengel | 73/189 |

Primary Examiner—Louis J. Capozi
Attorney, Agent, or Firm—Robert Shaw

[57] ABSTRACT

An apparent wind indicator for use on a sailboat and adapted to indicate wind direction relative to the boat in a manner that can be seen by direct observation of the vane of the indicator. The apparatus is particularly useful on small boats such as, for example, sunfish and the like, which have a single, lateen sail, the indicator being mounted near the forward edge or forward of the sail either on the boom or the yard thereof to be situated in clean air. A pair of wires, one disposed at an acute angle at each side of the vane and adjusted to a determined angle thereto, when aligned with the boom or some other reference line, give a directly observable indication of the optimal sailing wind on the basis of proper choice of said determined angle. The base of the device can be strapped to the boom or the yard of the boat sail. The vane and angle-indicating-wires combination can afterward be detachably secured to the base, thereby facilitating mounting and de-mounting of the whole device and assembly and disassembly thereof.

16 Claims, 10 Drawing Figures

PATENTED NOV 5 1974 3,845,734

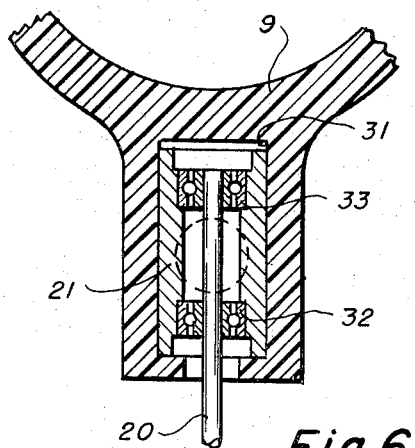
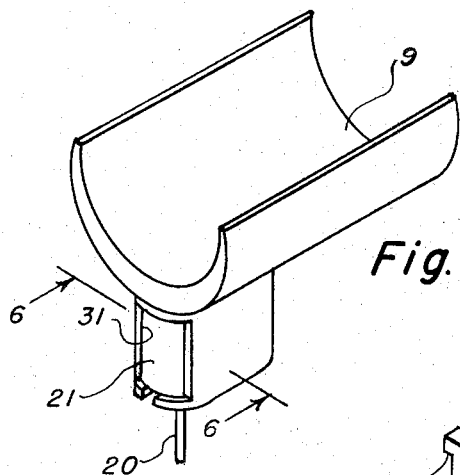
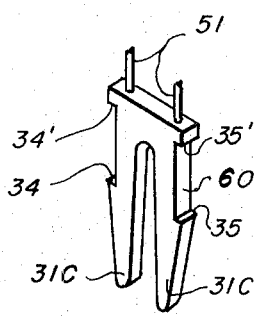
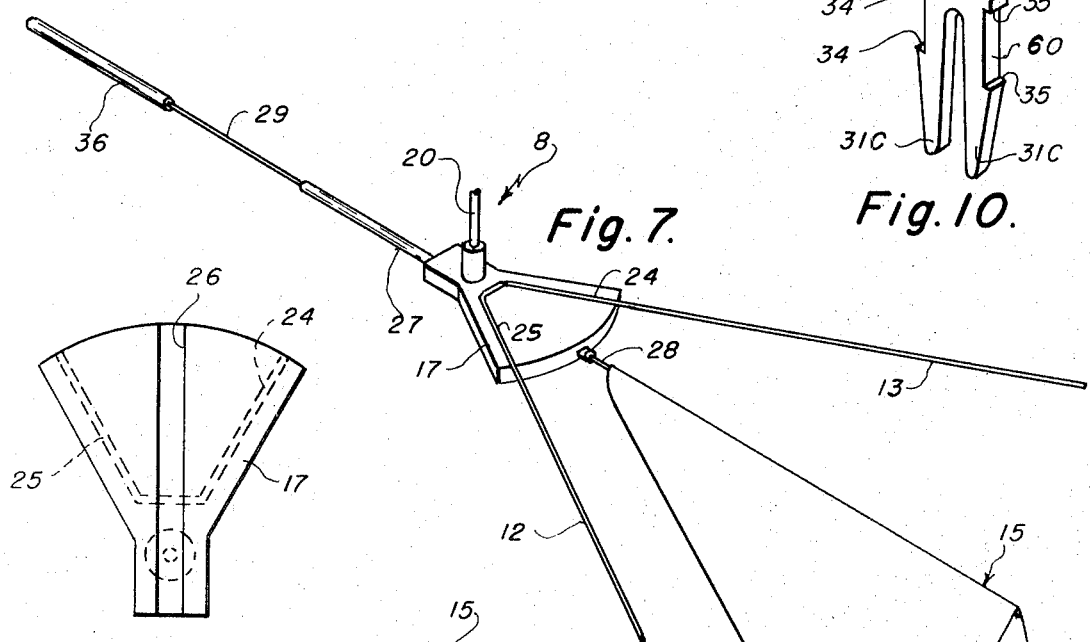
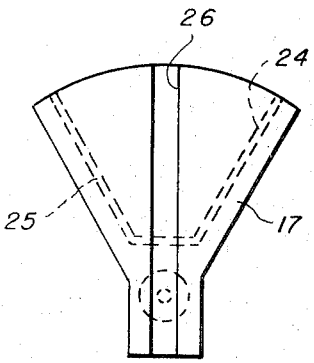
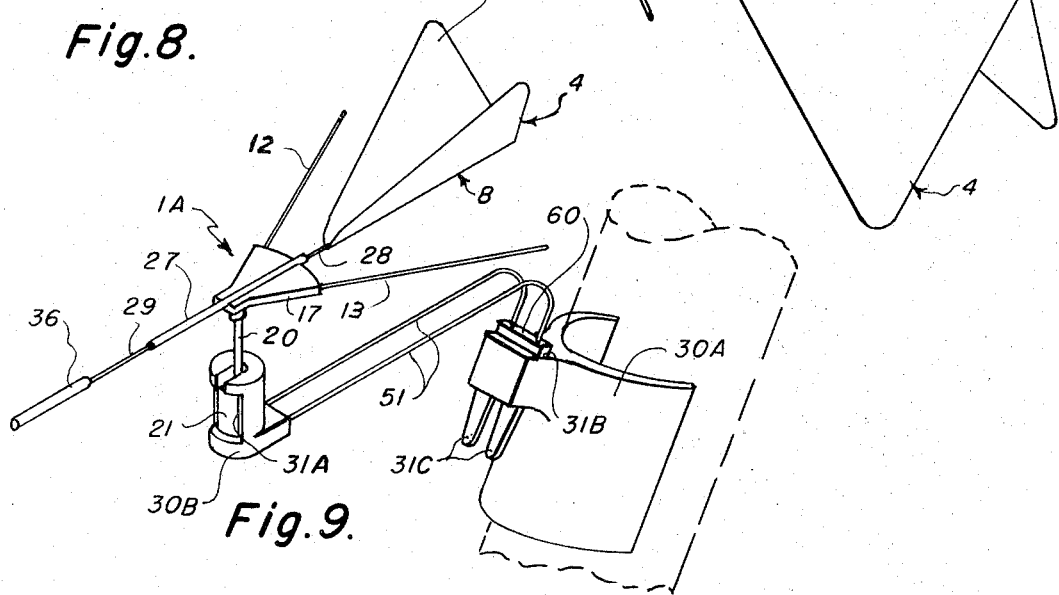

APPARENT WIND INDICATOR ADAPTED TO ESTABLISH OPTIMUM WIND DIRECTION RELATIVE TO THE SAIL OF A SAILBOAT

The present invention relates to an apparent wind indicator for sailboats and, more particularly, to an indicator that is economical to fabricate, easy to mount and demount, assemble and dis-assemble and which allows wind-to-vane optimization by direct visual observation of the indicator vane.

There has arisen in recent years a lively interest in racing small, lateen-sail, single-man sailboats of the sunfish type. This racing, which is highly competitive, has resulted in the development of various devices intended to give one sailor an advantage over another. The present invention is one such device, it being an object thereof to provide an apparent wind indicator that will allow optimized wind-to-sail angle of a moving sailboat.

The small boats of principal interest are low-priced (by comparison to the much larger seagoing vessels); a further object, therefore, is to provide an apparent wind indicator that is relatively economical to fabricate, but which will, nevertheless, give a reasonably accurate indication of the apparent wind.

These small boats are ordinarily removed from the water after each day of racing and disassembled; a still further object according, is to provide an indicator which is easy to mount on the boat and de-mount, one which is easy to assemble and/or disassemble.

Another object is to provide an apparent wind indicator which allows a sailboat operator, by direct observation of the wind vane and closely associated parts, to note a condition of optimum wind-to-sail angle. These and further objects are shown in the description that follows and are particularly delineated in the appended claims.

By way of summary, the foregoing objects are embodied in an apparent wind indicator for establishing an optimum apparent-wind indicator for establishing an optimum apparent-wind indication relative to the sail of a sailboat, which indicator includes a wind vane and means for attaching the vane to a main sail fixture of the boat at a location on the boat that is exposed to the apparent wind, that is, a location at which the wind striking the vane is unaffected by boat parts. The indicator has means for visually establishing by direct observation of the wind vane an optimum apparent-wind angle between the vane and the sail.

The invention is hereinafter explained with reference to the accompanying drawing in which:

FIG. 5 is a partial perspective view of a cylindrical-shaped base particularly adapted to use as part of the indicator mounted below the boom;

FIG. 6 is a partial section view taken upon the line 6—6 in FIG. 5 looking in the direction of the arrows;

FIG. 7 is a perspective view of a wind vane for the indicator of FIG. 1, said wind vane including a vane mount.

FIG. 8 is a plane view of the vane mount;

FIG. 9 shows a modification of the indicator shown in FIG. 2 and depicts the indicator located on the yard in FIG. 1; and FIG. 10 is a perspective view of a fork-shaped tongue which allows easy mounting and demounting of the wind vane in the modification illustrated in FIG. 9.

Figure 1:
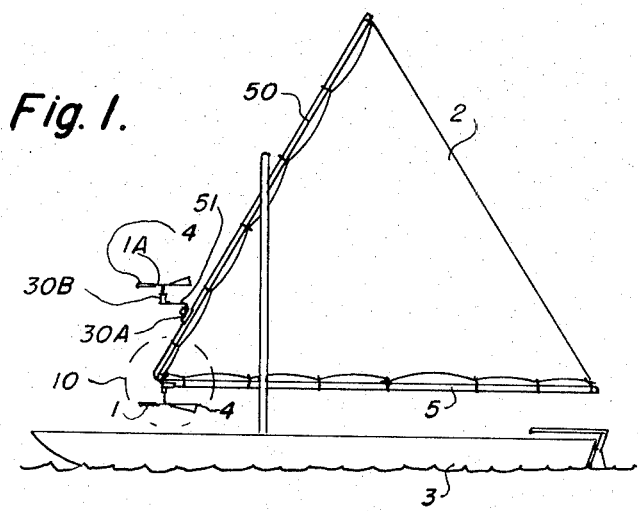
FIG. 1 is a side view of a lateen-sail sailboat having an apparent wind indicator of the present invention mounted on the underside of the sail boom and another indicator mounted on the forward edge of the sail yard.

Turning now to FIG. 1, apparent wind indicators are shown at 1 and 1A for establishing optimum apparent-wind direction relative to the sail labeled 2 of a single-sail sailboat 3. In the explanation that follows reference is made first to the indicator 1, the principal difference between the two indicators being in the mounting structure rather than in the principle of operation.

Figure 2:
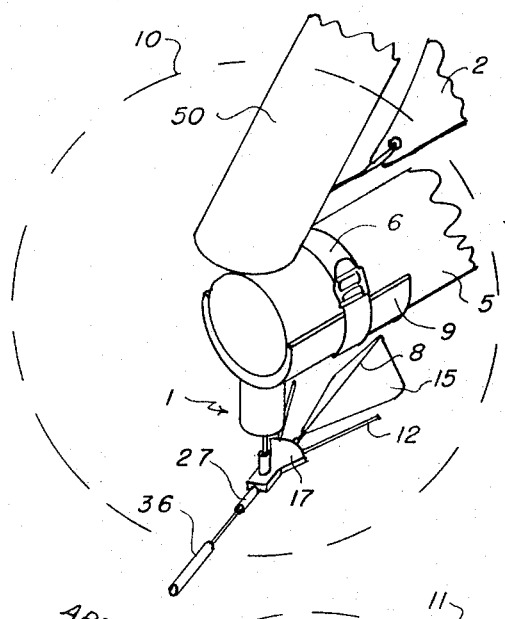
FIG. 2 is a perspective view, on an enlarged scale, of the elements within the dotted line labeled 10 in FIG. 1 and shows in some detail the indicator secured beneath the boom.

The indicator 1 comprises a wind vane 4 mounted at the underside of the boom shown at 5 at or near to the tip of the forward end of said boom so that the wind striking the vane 4 as the boat moves through the water is the true apparent wind unaffected by turbulence and the like due to the influence of the boat itself, as shown in FIG. 2. The cylindrical base labeled 9 of the indicator 1 is attached more or less permanently to sail fixture by means of a strap 6 which is received by a slot in the cylindrical base 9 and which can be wrapped around the boom 5 (or other sail fixture) thereby to secure the base 9 to the boom. The vane and shaft assembly labeled 8 hereinafter discussed can then be easily assembled upon the base 9 and is dis-assembled as later mentioned, but first there follows a discussion of the important function of the indicator and the means by which this function is performed.

The wind indicator herein discussed is intended primarily to allow optimizing of the wind-to-sail angle of the boat 3 during tacking or reaching maneuvers. Every sailboat has apparent wind-to-sail angles in such maneuvers, which for various conditions are optima for that particular boat. The present device allows an operator to adjust to one or more particular angles of this kind in the course of sailing, the magnitude of the angle having been pre-established, in the manner discussed in the next paragraph.

Figure 3:
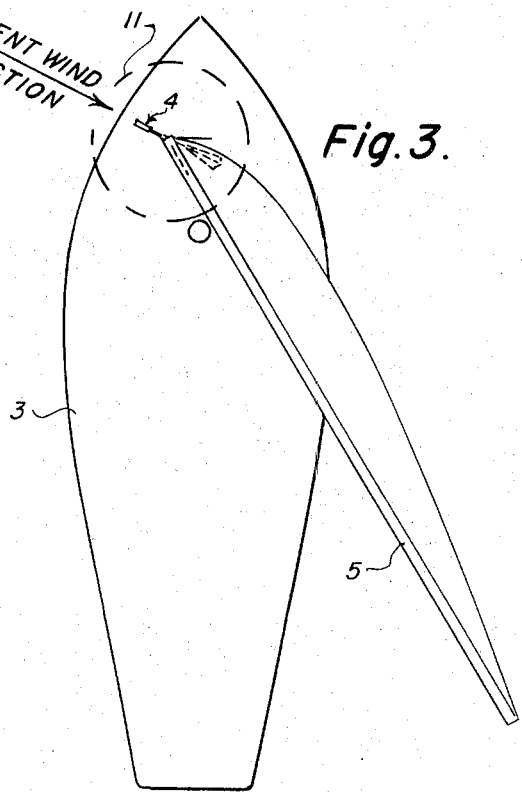
FIG. 3 is a plane view of the boat of FIG. 1 except that the yard is omitted to simplify the figure.
Figure 4:
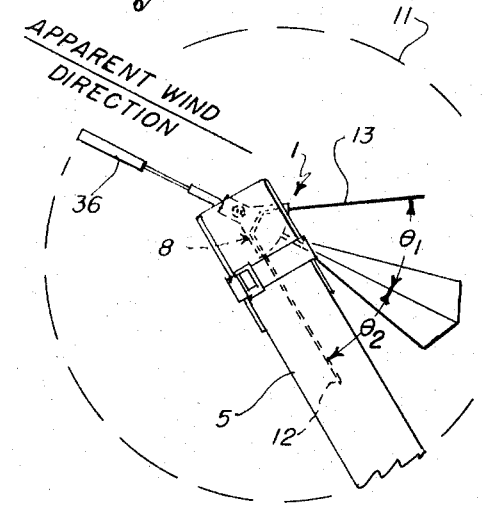
FIG. 4 is a view, on an enlarged scale, of the elements within the dotted line labeled 11 in FIG. 3.

The vane and shaft assembly 8 includes a shaft 20 which, as later discussed, is rotatably secured within a slotted cavity 31 in the cylindrical-(or wedge-) shaped base 9. With reference to FIGS. 5 and 6, ball-bearings 32 and 33 (or sleeve bearings with appropriate thrust surfaces) serve to hold the shaft 20, proper alignment being effected and maintained because of close tolerances between the bearings and a bearing housing 21 and between the outside of the housing 21 and the inner surfaces of the cavity 31. Also, the walls of the cavity 31 are sufficiently resilient to allow the housing 21 to be easily installed and removed but also to maintain the housing 21 and, thus, the shaft and ball bearing securely in place when they are installed within the cavity 31. In this way the wings designated 15 are enabled to orient to the direction of the relative wind; the direction of the wind-vane centerline relative to the line of the boom, as best shown in FIGS. 3 and 4, gives an immediate and direct visual determination of the apparent-wind direction relative to the sail. In addition to the above-named elements, the wind vane 4 also comprises wire-like members 12 and 13 connected together at one point to form an acute angle, the centerline of the wind vane (see FIG. 4) being disposed along the line that divides the acute angle into two parts, i.e., the angles shown at $\theta_1$ and $\theta_2$. The angles $\theta_1$ and $\theta_2$ are identical to the optimum port and starboard apparent wind-to-sail angle for the particular boat. One or the other of the wire-like members 12 and 13 is aligned with the boom 4 (or other suitable alignment reference indicative of the direction of the sail 2) whenever the optimum apparent-wind angle is achieved in the course of sailing. The boat skipper thereby establishes by direct visual observation of the wind vane 4, sail orientation to achieve the optimum angle.

Since the small lateen-sail boat, for which the present apparatus is primarily intended, is usually transported to and from the race area by trailer or on vehicle roofs, the apparatus must be and is easily mounted on the boat and dismounted. Also, the apparatus must be inexpensive. For these reasons, among others, the wind indicator described herein allows the system to be marketed in kit form from which complete assembly or sub-assembly can be effected. For example, the assembly 4 shown in FIG. 7, comprises a vane mount 17 which contains slots 24, 25 and 26 (see FIGS. 7 and 8) respectively to receive and to secure the wire-like members 13 and 12 and the tube designated 27, the shaft 20 being preferably permanently secured to the mount 17. The elements in FIG. 7 can be assembled by snapping the wires 12 and 13 and the tube 27 into the respective slots. The tube 27 receives further wires 28 and 29 which respectively retain the vanes 15 and a counterweight 36. The vanes can be crimpled and/or epoxied to the wire 28 and the counterweight can be similarly secured. The wires 28 and 29 can be similarly fastened to the tube 27 at appropriate lengths to assure proper balance of the assembly 4. It will be appreciated that a number of the elements of the present indicator (e.g., the base 9, the triangular mount 17, the two-winged vanes 15) can be made of molded plastic. It will be also appreciated that the members 12 and 13 can be made of thin stainless steel wires but, broadly, any material can be employed that can be bent to form the optimum angles $\theta_1$ and $\theta_2$ and which will retain the angular position in which it is placed. The shaft 20, the bearings 32 and 33, and the housing 21 must be made of stainless steel or some other corrosion resistant material.

The base 9 can, of course, be left attached to the boom by either the strap 6 or simple tape, or can be detached, as desired, and the shaft and vane assembly 8 can be snapped into the cavity 31 or removed therefrom, as mentioned previously.

The wind indicator 1 is secured to the underside of the boom, but the indicator 1A may be attached alternatively also to the forward edge of the gaff or yard, as can be seen in FIG. 1. Generally, the indicator can be attached to any sail fixture which moves with the sail and permits alignment of the members 12 and 13 with some reference indicative of the plane of the sail. The explanation immediately following is primarily directed to a base 30A (which is a modified form of the base 9) and one or two shape-adaptable rods 51 embedded and fastened in a tongue-like member 60 that is received and held by the base 30A in the manner now discussed.

As shown in FIG. 9, the member 60 is received by a cavity 31B in the base 30A. The cavity 31B is just slightly narrower than the member 60, the prong elements labeled 31C being forced together to allow entry thereof into the cavity 31B and removal therefrom. The flexible prongs 31C, it will be understood, upon insertion into the slightly narrower cavity 31B, compress together and then expand slightly to bring the flat regions between shoulders labeled 34–34' and 35–35' into contact with the cavity walls. Removal of the member 60 is effected by squeezing the prongs 31C together and withdrawing the tongue-like members. The wind vane of the indicator 1A, which is again designated 4 in FIG. 9 and which may be identical to the wind vane 4 previously described, is secured to the other end of the rods 51 by the mount shown at 30B in FIG. 9. The mount 30B has a cavity 31A similar to the cavity 31 to receive the housing 21 which again can be snapped into position and can be removed from such position. In the embodiment designated 1A, the extensions 51 can serve as the alignment reference.

In operative apparatus, the rod 20 and the extensions 51 are preferably made of stainless steel because of its corrosion-resistance qualities; the bases 9 and 30A, the mount 17, and the mount 30B are preferably of molded plastic construction; the vanes 15 are of thin light strip material such as metal or plastic sheet or screening; and the bearings and housing are preferably made of stainless steel or some other corrosion resistant material.

Further modification of the invention herein described will occur to persons skilled in the art and all such modifications are believed to fall within the spirit and scope of the present invention.

What is claimed is:

1. An apparent-wind indicator for establishing optimum apparent-wind direction relative to the sail of a sailboat, that comprises: a wind vane, mounting means secured to a sail fixture, the wind vane being rotatably attached to the mounting means, said mounting means being exposed to the apparent wind to permit orientation of the vane in the wind direction, said sail fixture being one that pivots with the sail, and means for visually establishing by direct observation of the wind vane an optimum apparent-wind angle between the vane and the sail.

2. An indicator as claimed in claim 1 in which the indicator includes mounting means adapted to mount the indicator on the sail fixture.

3. An indicator as claimed in claim 2 in which the means for establishing an optimum apparent-wind angle comprises at least two wire-like members connected together at one point to form an acute angle, the centerline of the wind vane being disposed along the line that divides the acute angle into two parts, said parts each being identical to said optimum apparent wind angle so that one or the other of said wire-like members is aligned with a suitable alignment reference indicative of direction of the plane of the sail whenever said optimum apparent-wind angle is achieved in the course of sailing, thereby establishing sail orientation to achieve the optimum angle.

4. Apparatus as claimed in claim 3 in which the means for mounting the indicator on the fixture includes a cylindrically-shaped base to receive the sail fixture and a strap to circle the fixture and secure the base and fixture together.

5. Apparatus as claimed in claim 4 in which the wind vane is secured to a shaft to form a vane and shaft assembly having bearing means to receive the shaft, one end of the base having a slotted cavity to receive and hold the bearing means, thereby to allow rotation of the shaft to permit orientation of the wind vane in the wind direction, the slotted cavity being adapted to allow the bearing means to be snapped into position and to be easily removed from such position.

6. An indicator as claimed in claim 5 in which the wind vane comprises a slotted vane mount to receive the wire-like members and to support the vanes, the wire-like members being received by slots in the mount for easy assembly thereof.

7. An indicator as claimed in claim 6 in which the mount has a longitudinal slot and which includes a tube disposed within the longitudinal slot and wire-like elements inserted in each end of the tube, one of the wire-like members secured to and supporting the wings and the other supporting a counterweight.

8. An indicator as claimed in claim 5 in which the bearing means includes at least one ball bearing securely positioned along the shaft and enclosed within a housing, the slotted cavity being adapted to receive and secure the housing.

9. An indicator as claimed in claim 5 in which the bearing means comprises a sleeve bearing to receive the shaft, the sleeve bearing being disposed within a housing and having a thrust bearing surface, the housing being received and held by said cavity.

10. An indicator as claimed in claim 4 which includes a shape-adjustable extension, the base being adapted to receive the extension but having a quick release mechanism to permit easy assembly and dis-assembly of the indicator.

11. An indicator as claimed in claim 10 in which said extension comprises at least one shape-adaptable rod one end of which is embedded and fastened in a tongue-like member that is detachably received by said base to permit said easy assembly and dis-assembly.

12. Apparatus as claimed in claim 11 in which the base has a cavity just slightly smaller than the tongue-like member and in which the tongue-like members has a plurality of shoulders and two flexible prongs, which prongs are received by the cavity in a compressed condition and thereafter expand within the cavity to bring the shoulders of the member into contact with the cavity walls.

13. Apparatus as claimed in claim 12 in which the other end of said rod is secured to a mount which contains a further cavity, and in which the indicator includes a vane and shaft assembly and bearing means to receive the shaft, said further cavity being adapted to receive and secure the bearing means to allow orientation of the wind vane in the wind direction.

14. Apparatus as claimed in claim 5 in which the shaft is oriented orthogonally to the plane of the two wire-like members and, in the installed indicator, is oriented substantially parallel to the mast of the sailboat.

15. Apparatus as claimed in claim 3 in which the means for mounting the indicator on the fixture includes a base having a cavity therein, a shape adjustable extension having rod means with one end embedded in a tongue-like member and the other end secured to a mount, the cavity being adapted to receive and detachably secure the tongue-like member and the mount being adapted to support the wind vane.

16. Apparatus as claimed in claim 15 that comprises a vane and shaft assembly and bearing means to receive the shaft, the mount having a further cavity to receive the bearing means which can be snapped into and removed from the further cavity.

* * * * *